United States Patent [19]

Vogt-Birnbrich et al.

[11] Patent Number: 5,569,705
[45] Date of Patent: Oct. 29, 1996

[54] AQUEOUS DISPERSION OF POLYURETHANE RESINS, THE PRODUCTION THEREOF AND POLYURETHANE MACROMERS SUITABLE FOR THIS PURPOSE, AS WELL AS THEIR USE IN AQUEOUS COATING AGENTS

[75] Inventors: Bettina Vogt-Birnbrich, Solingen; Hans-Peter Patzschke; Werner Lenhard, both of Wuppertal; Jurgen Dobert, Sprockhövel; Marcus Brunner; Walter Schubert, both of Wuppertal, all of Germany

[73] Assignee: Herberts Gesellschaft Mit Beschrankter Haftung, Wuppertal, Germany

[21] Appl. No.: 394,826

[22] Filed: Feb. 27, 1995

[30] Foreign Application Priority Data

Feb. 28, 1994 [DE] Germany ............... 44 06 547.7

[51] Int. Cl.⁶ ................... C08G 18/67
[52] U.S. Cl. ............ 524/591; 524/839; 252/182.18; 525/451; 525/454; 525/455; 526/301; 526/302; 528/71; 528/75; 522/90; 522/96
[58] Field of Search .............. 252/182.18; 524/591, 524/839; 525/454, 455, 456; 526/301, 302; 522/90, 96; 528/71, 75

[56] References Cited

U.S. PATENT DOCUMENTS 5,132,367  7/1992  Chan ........................ 525/131

*Primary Examiner*—Rachel Johnson
*Attorney, Agent, or Firm*—Schweitzer Cornman & Gross

[57] ABSTRACT

There are described aqueous dispersions of polyurethane resins, the production thereof and their use in aqueous coating agents, said dispersions being obtainable in aqueous or non-aqueous phase from a) polyurethane resins with at least one CH acidic group, an ionic or non-ionic hydrophilic group and, optionally, OH and/or NH groups, by b) introduction of olefinic double bonds by reaction with b$_1$) compounds with a CH acidic group and an olefinic double bond, and/or b$_2$) compounds with an olefinic double bond and also a group that is capable of reacting with CH acidic groups, and/or b$_3$) compounds with an olefinic double bond and also a group that is capable of reacting with OH or NH groups, or b$_4$) formaldehyde, whereupon, optionally, conversion into the aqueous phase and radical polymerization are effected.

21 Claims, No Drawings

AQUEOUS DISPERSION OF POLYURETHANE RESINS, THE PRODUCTION THEREOF AND POLYURETHANE MACROMERS SUITABLE FOR THIS PURPOSE, AS WELL AS THEIR USE IN AQUEOUS COATING AGENTS

BACKGROUND OF THE INVENTION

The invention relates to an aqueous dispersion of modified polyurethane resins which is suitable for the production of coating agents that are capable of being diluted with water, in particular for the generation of base layers in multilayer top coatings. It relates also to the production of the dispersion of the polyurethane resins which contain polymerised unsaturated monomers, and also to the use thereof. The invention also relates to polyurethane macromonomers which can be used in order to produce the modified polyurethane resins.

In particular in the lacquering of automobiles but also in other fields in which coatings having a good decorative effect and at the same time good protection against corrosion are desired it is known to provide substrates with several coating layers disposed above one another. In this connection an undercoat, a corrosion-protection layer for example, is generally firstly applied, then optionally intermediate layers, and then a coloured coating agent is also applied, followed by a transparent clear lacquer. In the coloured base layer use is made of metallic pigments or coloured pigments which result in metallic lacquer coatings or unilacquer coatings. Use may be made in this connection of coating agents which crosslink at elevated temperatures, or possibly of coating agents which dry or crosslink at temperatures below 100° C.

In the lacquering of automobiles use has previously been made in this connection of coating agents with a high content of organic solvent. With a view to reducing environmental pollution, efforts are being made to avoid using organic solvents in coating agents as far as possible.

Coating agents are known which predominantly contain water as solvent or dispersing agent and which contain organic solvents only in small amounts. The use of polyurethane dispersions (PU dispersions) in base lacquers is also known. For instance, in EP-A-0 089 497 metallic base lacquers are described which contain aqueous PU dispersions as binding agents. These binding agents contain ionic groups in the molecule. They are formed by synthesis of a prepolymer containing NCO groups which in aqueous dismersion is subjected to chain extension with diamines.

In DE-OS 26 63 307 and in DE-OS 19 53 348 the emulsion polymerisation is described of vinyl monomers in polyurethane dispersions based on OH-containing polyesters comprising ionic groups, whereby said polyesters serve to produce films. The vinyl monomers are acrylate esters or styrene, which may also contain functional groups.

In U.S. Pat. No. 4,318,833, with a view to producing metallic coating lacquers, aqueous dispersions of polyurethanes of low molecular weight containing carboxyl groups are reacted with ethylenically unsaturated monomers, whereby said dispersions contain large amounts of solvent. The lacquers which are formed exhibit inadequate resistance to water. In addition, the amounts of organic solvents are undesirable.

In the production of the PU dispersions described in the above references to the literature the chain extension of prepolymers is effected exclusively via the formation of C—N or C—O bonds. No CH acidic groups or olefinic groups are present.

In DE-A-4 122 266 polyurethane dispersions with terminal double bonds are described which can be polymerised with unsaturated monomers. In this connection he double bonds are incorporated by reaction via OH—, SH— or NH-functional unsaturated monomers into PU prepolymers terminated by NCO groups. Chain extension in the aqueous phase is not carried out.

Known from EP-A-0 367 051 are aqueous PU dispersions which comprise carbonyl groups that have been incorporated by reaction and also carbonyl groups. These functionalised polyurethanes are used as an aqueous dispersion. Crosslinking with polyhydrazides takes place in the dried film via the carbonyl group subject to formation of a C—N bond.

In the as yet unpublished DE patent application 42 28 851 made by the same applicant there are described aqueous PU dispersions in which chain extension of the structural units is carried out by reaction of CH acidic groups. But in neither reference are any further modifications to the PU polymers described.

The known aqueous coating agents which contain PU dispersions do not satisfy all stringent requirements. They have disadvantages in the adhesion to the additional layers of multilayer lacquer coatings. Problems arise in particular in the resistance to condensed moisture—i.e. when placed under load at elevated temperature and atmospheric moisture a peeling or blistering is to be observed. A further disadvantage of such dispersions is the amount of organic solvent that they contain. Furthermore the compatibility with additional binding agents in the coating agent is frequently problematic, so that the stability in storage is thereby reduced.

SUMMARY OF THE INVENTION

The object of the present invention is the provision of an ionically and/or non-ionically stabilised polyurethane dispersion which is low in solvent, resistant to hydrolysis and which exhibits good stability in storage. It should exhibit good compatibility with other binding agents and be usable for coating agents which are capable of being diluted with water and which are characterised by good adhesion of intermediate layers in the case of multilayer lacquering and which also produce good metallic effects and are resistant to chemicals. Even in the case of high molecular weights the polyurethanes should not give rise to any difficulties with viscosity in the course of production and handling.

DETAILED DESCRIPTION OF THE INVENTION

This object is achieved by means of an aqueous dispersion of polyurethane resins which may contain unsaturated monomers incorporated by polymerisation, which is obtainable from a) one or more polyurethane resins which contain at least one CH acidic group, at least one ionic group, a group that is capable of being converted into an ionic group and/or a non-ionic hydrophilic group and also, optionally, OH and/or NH groups, by b) introduction of one or more olefinic double bonds by reaction with b₁) one or more compounds which contain a CH acidic group and an olefinic double bond with the general formula

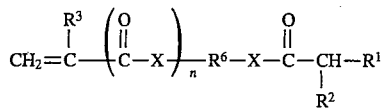   VI.

n=0 or 1,

X=O or NH, whereby the groups X may be the same or different, R¹=H, $C_1$–$C_6$ alkyl, —COOR³,

R²=—CN, —COOR³, —CONR³₂,

R³=H, linear or branched $C_1$–$C_8$ alkyl, whereby the residues R³ may be the same or different, R⁶=alkylene, cycloalkylene, arylene or alkylarylene, in particular with $C_1$ to $C_{12}$,
and/or b₂) one or more compounds which contain an olefinic double bond and also a group that is capable of reacting with CH acidic groups and that has the general formula VII

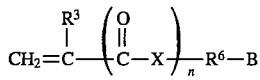   VII.

n=0 or 1
B=NCO, CHO, CH(OR)₂,

R⁶, X, R³=as defined under b₁),
R=alkyl with $C_1$ to $C_6$,
and/or b₃) one or more compounds which contain an olefinic double bond and also a group that is capable of reacting with OH or NH groups and that has the general formula VIII

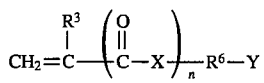   VIII.

with n, R³, X, R⁶=as defined under b₁) and
Y=isocyanate or epoxide group,
and/or b₄) formaldehyde,
in aqueous or non-aqueous phase whereupon a reaction product of a) and b) which is not yet present in aqueous phase is converted into the aqueous phase and in the aqueous phase is radically polymerised, optionally together with one or more radically polymerisable unsaturated monomers, optionally in the presence of customary additives.

The invention also relates to a process for the production of said aqueous dispersions of polyurethane resins which is characterised by reaction in aqueous or non-aqueous phase of a) one or more polyurethane resins which contain at least one CH acidic group, at least one ionic group, a group that is capable of being converted into an ionic group and/or a non-ionic hydrophilic group and also, optionally, OH and/or NH groups, with a view to the introduction of one or more olefinic double bonds with b₁) one or more compounds which contain a CH acidic group and an olefinic double bond, as defined above, and/or b₂) one or more compounds which contain an olefinic double bond and also a group that is capable of reacting with CH acidic groups, as defined above, and/or b₃) one or more compounds which contain an olefinic double bond and also a group that is capable of reacting with OH or NH groups, as defined above, and/or b₄) formaldehyde,
whereupon a reaction product of a) and b) which is not yet present in aqueous phase is converted into the aqueous phase and in the aqueous phase is radically polymerised, optionally together with one or more radically polymerisable unsaturated monomers, optionally in the presence of customary additives.

According to a preferred embodiment of the invention, with a view to chain extension the polyurethane resins a) may be reacted before or during the introduction of the olefinic double bonds with c) at least one compound which can react with at least two CH acidic groups.

The polyurethane resins contained in the dispersions according to the invention may, in the case of radical polymerisation without addition of other monomers, be 'homopolymers'. Corresponding 'copolymers' are obtained if the radical polymerisation is carried out in the presence of one or more copolymerisable unsaturated monomers.

For example it is possible to use polyurethane resins containing CH acidic groups, the production of which is described in EP-A-0 367 051.

They may be produced, for example, by reaction of one or more organic polyisocyanates with one or more compounds having more than one group that reacts with isocyanate and at least one ionic group, a group that is capable of ion formation and/or a hydrophilic group optionally one or more chain-extension agents and optionally one or more polyhydroxyl compounds one or more monoalcohols and/or polyalcohols containing at least one CH acidic group.

A further, preferred, way of producing a polyurethane resin which contains at least one CH acidic group proceeds, for example, by reaction of:

A) at least one polyurethane resin containing hydroxyl groups, whereby said polyurethane resin may contain urea groupings, with at least one ionic group, a group that is capable of ion formation and/or a hydrophilic group per molecule and an OH number between 10 and 150, preferably below 100, in non-aqueous medium, with B) at least one compound which exhibits at least one functional group suitable for reaction with at least a portion of the OH groups of the polyurethane resin and which furthermore contains a CH acidic group or a preliminary stage thereof.

These PU resins exhibit, for example, a molecular weight between 2,500 and 1,000,000, in particular between 5,000 and 100,000. Here and in the following description, molecular weight should be understood to mean the number average molecular weight (Mn).

A polyurethane resin A) containing OH groups may be produced in accordance with known processes—e.g. from linear or branched compounds with at least two groups that react with isocyanate organic polyisocyanates, in particular diisocyanates compounds with more than one group that reacts with isocyanate and at least one ionic group, a group that is capable of ion formation and/or a hydrophilic group.

If use is made in this connection of an excess of NCO, the reaction product may, for example, be reacted with aminopolyols to form OH polyurethanes.

Such OH polyurethanes are described, for example, in DE-A-39 03 804 or EP-A-0 469 38.

The polyurethane resin of component A) that contains hydroxyl groups preferably exhibits a content of urethane (NHCOO) and optionally urea (NHCONH) groups between 10 and 300 milli-equivalents per 100 g of solid resin.

These polyurethane resins containing OH groups can then be reacted with substances B) which exhibit CH acidic groups and other reactive groups. The polyurethane resin obtained by reaction of the components A) and B) exhibits, for example, residues with CH acidic groups that are bonded via ester functions. The following formula represents an example of such a resin.

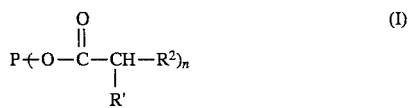

with $R'$=H, $C_1$–$C_6$ alkyl, —COOR$^3$ $R^2$=—CN, —COOR$^3$, —CONR$^3{}_2$,

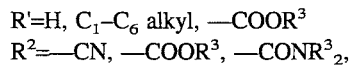

$R^3$=H, linear or branched $C_1$–$C_8$ alkyl, whereby the residues $R^3$ may be the same or different, P=polyurethane/polyurea polymer n=2 to 5 (=number of the ester functions with CH acidic groups present on the skeleton P)

The polyurethane resins can be prepared without organic solvents.

By way of polyol component in the production of polyurethane, use may for example be made of known polyether polyols, polyester polyols, polycarbonate diols or polyester polyols, polybutadiene oil diols or alpha-, omega-polysiloxane diols that are derived from lactones. In this connection the molecular weight lies, for example, between 300 and 4,000. Use is preferably made of linear diols.

Low-molecular components may optionally be added proportionally to the components of higher molecular weight. Use may be made, for example, of low-molecular alcohols or amines. Difunctional compounds and also at least trifunctional compounds or mixtures of such compounds come into consideration. By way of isocyanate for the production of the polyurethane dispersions, use may be made of any organic polyisocyanates—e.g. diisocyanates. These are widely known in lacquer chemistry. Use may be made of known aliphatic or aromatic hindered isocyanates such as are familiar to one skilled in the art and are also described, for example, in German patent application P 42 28 510.

With a view to producing the polyurethanes, use is furthermore made of low-molecular compounds which contain at least two groups that react with isocyanate and also at least one ionic group, a group that is capable of being converted into an ionic group and/or a hydrophilic group. Preferred are anionic groups or groups forming anions, in particular carboxyl groups. The procedure for this is known. Use may also be made of acidic polyesters such as are described in DE-A-39 03 804.

The anionic, cationic or non-ionic hydrophilic groups serve to stabilise the aqueous dispersion. Use may also be made of ionic and non-ionic groups jointly. Stabilisation by ionic groups is preferred.

The quantities in the production of A) are chosen in such a way that in the course of the reaction a reaction product with terminal, preferably primary, OH groups is formed—i.e. working is preferably effected with an excess of polyol. Component A) is converted with component B) into a polyurethane resin which exhibits CH acidic groups. In this way CH acidic groups are introduced into the polyurethane. Depending on the choice of component B) the products arising may, for example, exhibit the following groups, preferably terminally:

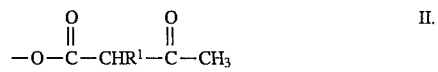 II.

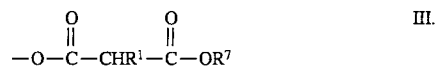 III.

 IV.

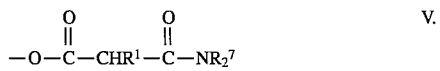 V.

wherein $R^1$ is defined as above by the general formula (I) and $R^7$=$C_1$–$C_8$ alkyl, linear or branched, whereby in case several residues $R^1$ or $R^7$ are present these may be the same or different.

The synthesis may be effected in various ways known in the literature.

In accordance with the invention olefinic double bonds are incorporated by reaction into the polyurethane resin to form a macromonomer containing unsaturated groups. This may be effected using compounds $b_1$), $b_2$), $b_3$) or $b_4$). If use is made of compounds of the type $b_1$) then these are introduced by means of the chain-extension agent; to this end the amount of substances c) necessary for chain extension is chosen in such a way that the compounds $b_1$) with the activated unsaturated double bonds can be incorporated by reaction into the polyurethane resin.

If use is made of compounds of the type $b_2$) which in addition to the unsaturated double bond exhibit groups that react with CH acidic groups, the quantity is chosen in such a way that the acidic groups in the macromonomer are sufficient to ensure the reaction with the component c) and also to enable a sufficient reaction with the reactive groups of the component $b_2$). But it is also possible to achieve chain extension by using $b_2$) if $b_2$) is difunctional. In this connection a separate reaction with c) is then unnecessary.

Similarily, at this stage of the reaction, with OH or NH groups of the polyurethane resin present, a reaction with compounds of the type $b_3$) can be effected. In this connection the unsaturated double bonds are added by reaction onto the lateral hydroxyl or amino groups of polyurethane resin. This does not affect chain extension by means of the CH acidic components.

If use is made of formaldehyde as $b_4$), double bonds are formed as a result of Knoevenagel reaction with CH acidic centres. The number of olefinic bonds is controlled by means of the amount of $b_4$). If, considered in molar terms, a deficiency of formaldehyde is present in relation to CH acidic groups, then chain extension has to be continued further by the use of c). If use is made of amounts less than two mol then chain extension occurs simultaneously with the synthesis of the double bonds. The separate reaction with c) is then unnecessary.

In any case, it should be ensured that a sufficient amount of olefinically unsaturated double bonds is maintained in the polyurethane macromonomer. The amount should be between 0.3 mMol and 5 mMol per g of resin. The reaction to form the macromonomer may be effected in non-aqueous medium—e.g. by reaction of compounds of the type $b_3$)—or it may also be effected in the aqueous phase, in particular in the case of reaction with the components $b_1$) and $b_2$). Reactions with $b_4$) may take place both in the organic phase and in the aqueous phase.

Suitable by way of component $b_1$ are compounds with the general formula:

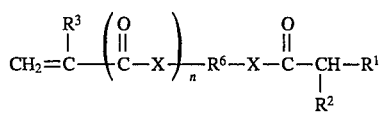

$n=0$ or 1

$X=0$ or NH, whereby the groups X may be the same or different, $R^1, R^2, R^3$ as defined under I $R^6$=alkylene, cycloalkylene, arylene or alkylarylene, in particular with $C_1$ to $C_{12}$.

Here it is a question of, for instance, reaction products of the reaction of acetoacetic ester or diketene with hydrofunctional monomers such as are described below. Particularly preferred are acetoacetoxyethyl (meth)acrylate and diacetone acrylamide.

Suitable by way of compounds $b_2$) are compounds of the general formula:

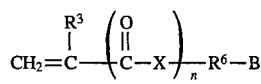

$n=0$ or 1
$B=NCO, CHO, CH(OR)_2$,

$R^6, X, R^3$=as defined above.

The isocyanate-functional compounds of the general type VII are, for example, reaction products of hydroxyfunctional unsaturated monomers with an excess of diisocyanates and polyisocyanates, such as hydroxyethyl (meth)acrylate and isophorone diisocyanate. In addition, use may for example be made of other unsaturated isocyanates such as isocyanate ethyl (meth)acrylate, (meth)acrylaryl isocyanate and meta-isopropenyldimethylbenyl isocyanate.

Examples of unsaturated monomers with aldehyde, acetal or keto groups are acrolein, methacrolein, vinylalkyl ketones with 1 to 20, preferably 1 to 10, carbon atoms in the alkyl residue, formyl styrene, (meth)acrylic acid alkyl esters with an aldehyde or keto group in the alkyl residue, preferably with 3 to 10 carbon atoms, such as (meth)acryloxyalkylpromanal, whereby (meth)acrylamidobutyraldehydedimethylacetal or the corresponding free aldehyde are particularly suitable.

Suitable by way of substances $b_3$) are compounds which exhibit an unsaturated double bond and also a functional group that reacts with NH or OH groups. Examples of these are compounds of the general formula:

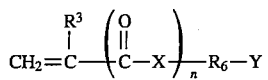

with $n, R^3, X, R^6$=as defined above and

Y=isocyanate or epoxide group.

Preferred are glycidyl-functional unsaturated monomers, in particular glycidyl (meth)acrylate.

The reaction of the polyurethane a) with the component b) may, depending on the choice of b), be effected in the presence or absence of the optional component c).

Before or after the reaction of the components b) and, optionally, c) with the polyurethane resin, olefinically unsaturated monomers d) may be added. These monomers should exhibit no centres that react with CH acidic groups, they are essentially present in the inert state and should not interfere with a reaction of b). Polymerisation should not yet occur at this stage.

The monomers d) may be added before, during or after the production of the dispersion. The monomers may for example be added in such proportions that in the resulting polyurethane acrylic resin the proportion of polyurethane-resin units to acrylic-resin units amounts to 100:0 to 30:70, relative to the weight of solids. If the proportion of acrylic resin amounts to 0 wt-%, then a homopolymer consisting of the polyurethane macromonomers is present.

Suitable for further synthesis or chain extension of the polyurethane dispersions subject to functionalisation with unsaturated groups are compounds c) which can react with CH acidic centres. In this connection macromers with unsaturated polymerisable groups are formed. In this connection there has to be a possibility of at least a dual reaction of component c). Examples of component c) are aldehydes and polyisocyanates with at least two isocyanate groups. Particular examples are:

1. Aromatic, aliphatic or cycloaliphatic aldehydes which may be present in monomeric or polymeric form, such as formaldehyde, acetaldehyde, glyoxal, glutardialdehyde, paraformaldehyde, propionaldehyde, butyraldehyde, isobutyraldehyde, 2-methylpentenal, furfural or acrolein.

2. Aromatic, aliphatic or cycloaliphatic polyisocyanates such as are customary in lacquer chemistry. Besides the known suitable diisocyanates, those that are also suitable for polyurethane synthesis A) for example, use may also be made of prepolymers containing NCO groups or isocyanates of higher functionality (with an NCO functionality of more than 2). These are, for example, isocyanates of the biuret or isocyanurate type. They may be low-molecular and high-molecular substances. Other aliphatic polyisocyanates may be produced, for example, by selective reaction of silylated polyalcohols with isocyanate carboxylic acid chlorides. Examples of such polyisocyanates containing ester groups are those based on hexane diisocyanate and pentaerythritol.

In addition to component c) low-molecular compounds with a molecular weight below 1,000 may optionally be added which comprise at least 2, preferably 3 to 5, CH acidic groups. These can therefore result in a branching of the product. For example, it is a question of compounds of the formula IX.

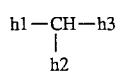

IX.

with h1 selected from

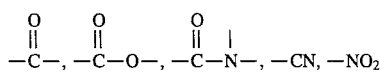

with h2 selected from

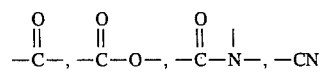

with h3 selected from

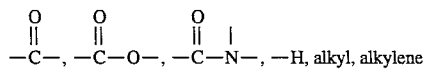

whereby the carboxyl or carbonamide groups defined by the above residues h1, h2, h3 are in each case bonded via the carbon atom to the CH group and the CH group is optionally bonded via at least one of the residues h1, h2 and/or h3 to an oligomeric unit.

The suitable chain-extension reagents c) may be used individually or in combination. The chain extension may also be effected at least partly before the conversion into the aqueous phase, but it is preferably carried out in the aqueous phase. With a view to acceleration the reaction may optionally be healed to moderately elevated temperatures.

The reaction of the components with a view to synthesising the PU macromers is preferably effected without solvent, preferably in stages in accordance with known processes of organic chemistry. Optionally, however, the solvents familiar to one skilled in the art, which are suitable or the synthesis of polyurethane, may also be added. These may optionally be distilled off later in a vacuum before subsequent processing. Small amounts of remaining solvent residues do not have a negative effect in the finished dispersion. If unsaturated monomers d) are used in the reaction mixture of a) with b) it is generally unnecessary to add organic solvents prior to the chain extension.

Chain extension is to be understood to mean an increase in the molecular weight by linkage of two or more PU macromers via the CH acidic groups subject to preservation of the unsaturated double bonds.

The reaction product formed from a), b) and optionally c) is converted into the aqueous phase. With a view to conversion into the aqueous phase, groups that are capable of being converted into ionic groups are transformed by neutralisation into the ionic groups. With a view to producing anionic groups, acid groups—e.g. carboxyl groups, phosphoric acid groups and sulphonic acid groups—are neutralised, at least partially, by bases such as amines and ammonia which are customary in the field of anionic lacquers. With a view to producing cationic groups, basic groups— e.g. primary, secondary and tertiary amino groups—are neutralised with customary acids, in particular organic acids such as formic acid, acetic acid and lactic acid. Neutralisation may be effected wholly or partially. Neutralisation may be effected either before the addition of water or simultaneously with the addition of water. Ionic groups which may be present in the PU resins are, for example, onium groups such as ammonium, phosphonium and tert.-sulphonium groups. Examples of non-ionic hydrophilic groups are polyether chains with incorporated ethylene oxide units. The conversion of the polyurethane resins into the aqueous phase may be effected in batch—for example by adding the individual constituents into a mixing kettle equipped with stirrers. But it may also be effected continuously, and for this purpose use may be made, for example, of emulsifying machines into which all constituents, resin, water and, optionally, additives such as necessary neutralising agents, are introduced.

After the conversion into the aqueous phase the reaction with c) with a view to chain extension can then also take place if a reaction in the organic phase is not desired or has not already taken place. In the course of the chain extension the compounds of the type $b_1$) are then also incorporated into the PU molecule by reaction. The PU macromers in the form of a dispersion resulting from the components a, b and c preferably exhibit an acid number of 5 to 90, 10 to 50 being particularly preferred. The number average molecular weight (Mn) of the unsaturated PU macromonomers according to the invention amounts, for example, to between 2,500 and 1000,000, preferably between 5,000 and 50,000. They are generally not crosslinked. The OH number and the amine number preferably lie between 5 and 100. The unsaturated functionalised PU macromonomers according to the invention which arise form stable dispersions. They may also be used directly in coating agents that cure by oxidation or by irradiation, or in adhesives.

As described above, with this reaction the monomers of d) may already be present. They do not interfere with the reaction. In the aqueous phase, compounds of the type d) may also be added subsequently—i.e. monomers with radically polymerisable double bonds are incorporated by emulsification. Processes for the incorporation by emulsification of olefinically unsaturated monomers into polymer dispersions are known. They are described, for example, in DE-A-37 22 005. Also described therein are examples of monomers that are suitable in accordance with the invention.

In the production of the PU macromer dispersions according to the invention in which the chain-extended polyurethane and also the monomers are contained in dispersed form there may also be added, optionally, anionic and/or non-ionic emulsifiers. Such production processes are also described, for example, in DE-A-23 63 307. The polymerisation which then follows may, for example, be effected at elevated temperature—e.g. at a temperature of 30° to 100° C. Higher temperatures may optionally also be employed, particularly if in this connection the reaction pressure is increased to around 10 bar.

All radically polymerisable monomers are suitable as component d). Use is preferably made of such monomers d) which result in a copolymer having a glass transition temperature which lies above the glass transition temperature of the polyurethane resin submitted. The unsaturated monomers which contain no additional reactive groups are selected in accordance with mechanical and compatibility characteristics. Use may be made, for example, of acrylic acid alkyl esters, methacrylic acid alkyl esters, maleic acid dialkyl esters and/or fumaric acid dialkyl esters, whereby the alkyl esters consist of 1 to 20 carbon atoms and are linear, branched, aliphatic, cycloaliphatic and/or (alkyl)aromatic. Hard monomers with a high second-order transition temperature as polymers are, for example, monomers of the vinyl aromatic type such as styrene, methylstyrene, o-, m- and p-alkylstyrenes such as vinyl toluene or p-tert.-butylstyrene, halogenated vinyl benzenes, methacrylic acid esters with short chains, such as methyl methacrylate, ethyl methacrylate, propyl methacrylate, butyl methacrylate, cyclohexyl methacrylate, alkyl-substituted cyclohexyl (meth)acrylates, isobornyl methacrylate, dihydrodicyclopentadienyl methacrylate, (meth)acrylamide and/or (meth)acrylonitrile. Soft monomers, on the other hand, are acrylic acid esters with a long alcohol chain, such as n-butyl acrylate, isobutyl acrylate, tert.-butyl acrylate, 2-ethyl-hexyl acrylate and/or lauryl acrylate. Use may also be made of unsaturated ethers such as ethoxyethyl methacrylate or tetrahydrofurfuryl acrylate. Monomers of the vinyl ester type, preferably vinyl esters of branched monocarboxylic acids, particularly of versatic acid vinyl esters or pivalic acid vinyl esters, may also be incorporated by polymerisation if suitable reaction conditions and reaction monomers are selected. The expression (meth)acryl here signifies acryl and/or methacryl.

Optionally it is possible to make use of monomers which are capable of being incorporated by polymerisation and which contain functional groups. These may be hydroxyl groups, amino groups, epoxide groups, amide groups or carboxylic acid groups. By way of monomers containing carboxylic groups, use is preferably made of acrylic acid and methacrylic acid.

By way of monomers containing amino groups, use may for example be made of monomers of the general formula:

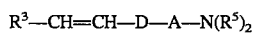

$R^3$—CH=CH—D—A—N($R^5$)$_2$ whereby $R^3$=as defined above

A=alkylene or hydroxyalkylene (e.g. with 1 to 6 C atoms)

$R^5$=$R^3$ or hydroxyalkyl (e.g. with 1 to 6 C atoms)

D=—COO—, —CONH—, —CH$_2$O— or —O—

Examples of unsaturated monomers containing N groups are N-dialkyl or N-monoalkyl aminoalkyl (meth)acrylates or the corresponding N-alkanol compounds such as N-dimethylaminoethanol acrylamide and/or heterocyclic compounds containing vinyl groups and with one or more basic nitrogen atoms, such as N-vinylimidazole or adducts of glycidyl (meth)acrylate with amino alcohols.

Radically polymerisable monomers containing hydroxyl groups are to be understood to include, for example, those which besides a polymerisable ethylenically unsaturated group also include at least one hydroxyl group on a $C_2$ to $C_{20}$ linear, branched or cyclic hydrocarbon residue. These are, for example, unsaturated esterification products of the general formula

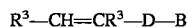

$R^3$—CH=$CR^3$—D—B wherein $R^3$ and D are as defined above, and

B is a linear or branched $C_{1-6}$ alkyl group with 1 to 3 OH groups.

Particularly suitable are (meth)acrylic acid hydroxyalkyl esters such as 2-hydroxyethyl acrylate, 2-hydroxypropyl methacrylate, butanediol-1,4-monoacrylate, 2,3-dihydroxypropyl methacrylate, pentaerythritol monomethacrylate, polypropyleneglycol monoacrylate or possibly fumaric acid dihydroxyalkyl ester. However, use may also be made of N-hydroxyalkyl (meth)acrylamide or N-hydroxyalkyl fumaric acid monoamides or diamides such as N-hydroxyethyl acrylamide or N-(2-hydroxypropyl) methacrylamide. Particularly elastic properties can be obtained with the use of a reaction product of hydroxyalkyl (meth)acrylate with caprolactone. Other compounds containing hydroxyl groups are allyl alcohol, monovinyl ethers of polyalcohols, particularly of diols, such as monovinyl ether of ethylene glycol or of butanediol and also allyl ethers or allyl esters containing hydroxyl groups, such as 2,3-dihydroxypropylmonoallyl ether or trimethylpropanemonoallyl ether.

Likewise it is possible to make proportional use of suitable polyunsaturated monomers. These are, for example, reaction products of polyalcohols, in particular dialcohols with α- and β-unsaturated carboxylic acids. Ethylenically polyunsaturated monomers should be understood to mean compounds with at least two radically polymerisable double bonds.

Examples of such compounds are ethanediol diacrylate, ethyleneglycol dimethylacrylate, 1,4-butanediol diacrylate, 1,6-hexanediol diacrylate, neopentylglycol dimethacrylate, triethyleneglycol dimethacrylate, polyglycol-400-diacrylate, glycerine dimethacrylate, trimethylolpropane triacrylate and/or pentaerythritol diacrylate. Polyfunctional monomers containing urethane and amide groups are produced by reactions of, for example, hexane diisocyanate, methacrylic acid-β-isocyanatoethyl ester or dimethyl-m-isopropenyl-toluyl isocyanate with hydroxyethyl (meth)acrylate or (meth)acrylic acid. Examples of additional suitable compounds are allyl methacrylate, diallyl phthalate, butanediol vinyl ether, divinylpropylene carbamide, maleic acid diallyl ester, bismaleic imide, glyoxabisacrylamide and/or reaction products of epoxy resin with (meth)acrylic acid or fumaric acid half-esters. Preferred is the use of difunctional unsaturated monomers such as butanediol diacrylate or hexanediol diacrylate. With the use of glycidyl methacrylate and methacrylic acid the corresponding glycerine dimethacrylate arises automatically in the course of polymerisation. In similar manner the reaction of incorporated etherified alkoxy (meth)acrylamide with amide, carboxyl or hydroxyl groups can be utilised. The type and amount of polyunsaturated monomers should be carefully coordinated with the reaction conditions (catalysts, reaction temperature, solvent) in order to prevent gelling.

The quantity of monomers amounts to 10–90 wt-% relative to the PU macromers, preferably 15–50 wt-%.

By means of the quantity of the polyunsaturated monomers it is also possible to obtain crosslinked reaction products. According to a preferred embodiment 0.1 to 7% by weight of the radically polymerisable monomers may be replaced by ethylenically polyunsaturated monomers.

Copolymerisation is effected in known manner preferably by emulsion polymerisation subject to addition of radical initiators and also, optionally, regulators at elevated temperatures of 50° to 160° C. for example. It is effected in the aqueous phase in which monomers and polymers are emulsified jointly. The solids of the polymer after complete polymerisation amount in this case to about 20–65 wt-%. In general the mixture is heated to reaction temperature. The monomer mixture may also be charged during the reaction. In order to be able to work at reflux temperature the initiator is matched to the boiling temperature of the solvent mixture. By way of initiators that are soluble in organic solvents there are added 0.1 to 5 wt-%, preferably 0.5 to 3 wt-%, relative to the amount of monomers used, of customary radical initiators—e.g. water-soluble, preferably water-insoluble peroxides and/or azo compounds. By way of peroxides, use is made, for example, of benzoyl peroxide or di-tert.-butyl peroxide, hydroperoxides such as tert.-butyl hydroperoxide or cumene hydroperoxide and peresters such as tert.-butyl peroctate or tert.-butyl perbenzoate. Azo compounds which decompose thermally are, for example, 2,2'-azo-bis(2-cyanopropane) or 1,1'-azobiscyciohexanecarbonitrile. By way of initiators, use may also be made of radical-forming compounds of the dibenzyl type such as 1,2-bis(4-methylphenyl)1,2-dicarbethoxy-1,2-dicyanoethane. It is possible to work in the presence of customary regulators, by means of which the molecular weight can be reduced in known manner. For this purpose use is preferably made of mercaptans, halogen-containing compounds and other radical-transmitting substances. Particularly preferred are n- or tert.-dodecylmercaptan, tetrakismercaptoacetyl pentaerythritol, tert.-butyl-o-thiocresol, butene-1-ol or dimeric methylstyrene.

After the polymerisation of the unsaturated monomers the molecular weight amounts to over 5,000, preferably over 50,000 and under 1,000,000. The acid number preferably lies between 5 and 90, the OH number preferably lies between 5 and 100.

The solids of the dispersions may amount to between 20% and 65%. Non-crosslinked products may be obtained, or crosslinked microgels are obtained. The particles are stabilised by ionic groups or by non-ionic groups, in particular by anionic groups.

The dispersions according to the invention that are obtained are opalescent dispersions which are stable in storage. They present low viscosity and exhibit good compatibility with other binding agents. By virtue of the chain structure in the aqueous phase it is possible for high-molecular binding-agent dispersions to be produced without incurring problems with viscosity.

From the crosslinked or non-crosslinked dispersions according to the invention it is possible to produce aqueous coating agents that are low in solvent. To this end, pigments, for example, are added to the dispersions, optionally other binding agents and additives and also, optionally, small amounts of solvent.

The additional other binding-agent components optionally present in the coating agent may be, for example, water-dilutable polyester resins and/or polyacrylic resins and/or polyurethane resins, optionally melamine resins and/or blocked polyisocyanates by way of crosslinking agents. The total weight of the additional water-dilutable binding-agent components and crosslinking agents may amount to between 0 and 90 wt-%, preferably between 5 and 50 wt-%, relative to the solids content of the entire binding-agent mixture. Use may be made of the customary water-dilutable binding agents.

In the case of the addition of other binding agents it goes without saying that additional ionically stabilised resins and dispersions can be used only together with similarly charged ionic dispersions according to the invention, in order not to have a negative effect on the stability.

In order to produce the coating agents according to the invention, use may be made of various crosslinking agents such as, for example, formaldehyde condensation resins such as phenol formaldehyde condensation resins and amine formaldehyde condensation resins and also, optionally, blocked polyisocyanates. The amount of the crosslinking agent relative to the overall quantity of binding agents may be, for example, 0 to 50 wt-%, in particular 5 to 40 wt-%.

With the invention, by way of crosslinking agents in coating agents use may be made of any known polyisocyanates in which the isocyanate groups have been reacted with a compound so that the blocked polyisocyanate formed is resistant to hydroxyl groups and water at room temperature. Preferred are the isocyanates that do not exhibit any yellowing in the event of weathering or heating.

Use may also be made of unblocked isocyanates. However, these are added to the coating agent only a short time prior to application. It is then a matter of 2-component coating agents.

The coating agents may furthermore contain lacquering additives, for example agents that influence rheology, such as highly dispersed silicic acid, layered silicates or polymeric urea compounds. Substances which also act as thickeners are, for example, water-soluble cellulose ethers and also synthetic polymers with ionic groups and/or groups which act associatively, such as modified ethoxylated polyurethanes or polyacrylates. In addition, use may also be made of anti-settling agents, flow-control agents, light-protection agents, anti-foam agents such as silicone-containing compounds, wetting agents, for example paste resins, and also adhesion-promoting substances. In order to accelerate curing, use may optionally also be made of catalysts, but it is also possible to cure by means of thermal energy without the use of a catalyst.

Customary lacquering solvents are suitable by way of solvents that are present in small amounts. These may stem from the production of the binding agents or may be added separately.

By the selection of the solvents it is possible to influence the flow, the compatibility, the viscosity or the adhesion of the coating agent.

Suitable by way of pigments are, for example, transparent or opaque inorganic and/or organic coloured pigments and/or effect-creating pigments such as metallic or pearlescent pigments. The quantity amounts, for example, to 0.5 to 25 wt-%, relative to the coating agent. Mixtures of effect-creating pigments, coloured pigments, dyestuffs or fillers may be used.

The coating agents according to the invention may be produced in accordance with methods known as such. The solids, the pH value and the viscosity of the coating agent may optionally be adjusted in customary manner. Care should be taken to ensure that the constituents used are compatible with one another and result in a coating-agent composition that is stable in storage.

The pH value of the coating agents preferably lies between 6.5 and 8. As a rule the finished coating agents exhibit, for example, a solids content of 10 to 45 wt-%, the content of organic solvents lies, for example, below 10 wt-%, preferably below 5 wt-%, in each case relative to the overall quantity of coating agent.

The binding agents are particularly suitable for the production of coating agents for base layers which impart colour. But it is also possible to produce therefrom other coating agents—e.g. undercoats, fillers or layers for protection against the impact of stones. In this connection the selection of the pigments and additives and their concentration are adapted to the particular intended use. Clear-lacquer coating agents may optionally also be produced.

By virtue of the dispersions according to the invention the coating agents exhibit good compatibility of the binding agents. They present a high degree of stability in storage and do not result in sedimentation or flocculation in the lacquer. They contain no solvents or only small amounts of solvent and at the same time present good flow characteristics when forming films.

The invention also relates to a process for the production of a multilayer coating wherein a coloured layer of base lacquer with the coating agent according to the invention is applied onto an 6optionally undercoated substrate. This layer of base lacquer is either dried by being exposed to heat or a layer of clear lacquer may be applied wet-on-wet onto said layer of base lacquer. Suitable by way of clear lacquer are, in principle, all known non-pigmented or transparently pigmented coating agents. Subsequent to application the layer of clear lacquer and, optionally, the layer of base lacquer are dried, preferably jointly, by being exposed to heat. The temperatures may, for example, lie between 20° and 150° C. For repair purposes, temperatures of 20° to 80°C., for example, are preferred. For the purpose of series lacquering, temperatures above 100° C., for example above 110° C., are preferred.

The multilayer lacquer coating according to the invention exhibits a good surface. The adhesion between the layers and the layer of base lacquer is good and presents no peeling faults, even when placed under load in the climate of the humidity chamber.

Suitable by way of substrates are metal and plastics substrates, in particular the substrates known in the automobile industry. However, the coating agents according to the invention are also outstandingly suitable for the lacquering of other substrates, in particular mineral substrates such as concrete, glass, ceramic and wood, and also for the coating of foils (plastics ad paper foils) and for producing thin layers for the adhesion-bonding of several substrates.

EXAMPLE 1

Polyurethane Dispersion 1:

518 g of a polyester formed from hexanediol, neopentylglycol, adipic acid and isophthalic acid with a hydroxy number of 130 and an acid number below 3 and 54 g dimethylol propionic acid are dried for 1 h at 100° C. in a vacuum. Then cooling is effected to 80° C. and 178 g isophorone diisocyanate are added in such a way that the reaction temperature does not exceed 85° C. The reaction mixture is held at this temperature until such time as no more free NCO groups can be detected. Then the addition of 75 g acetoacetic ester is begun. After the addition is complete the temperature is increased within 1 h to 140° C. and is held at this value until no more distillate passes over. In order to remove the residues of cracked alcohol and non-reacted acetoacetic ester, a vacuum is applied for a short time.

In order to convert into a macromer the polyurethane that has been functionalised by acetoacetic ester, neutralisation is firstly effected with 20.2 g triethylamine and then a stable dispersion with a solids of 40 wt-% is produced with 1221 g of completely demineralised water. With a view to functionalisation 34 g formaldehyde solution (37 wt-%) are added and stirred for 2 h at 25°–30° C.

| acid number (mg KOH/g): | 29.5 |
| pH value: | 7.2 |
| solids: (30 min. 150° C.) | 39.5 wt-% |

EXAMPLE 2

641 g of a commercially available polycaprolactone diol with the hydroxy number 112 and 48.2 g dimethylol propionic acid are dehydrated for 1 h at 110° C. in a vacuum. Cooling is effected to 80° C. and 177.6 g isophorone diisocyanate are added in such a way that a temperature of 85° C. is not exceeded. The reaction mixture is held at this temperature until such time as no more free isocyanate can be detected. The reaction mixture is heated to 100° C. and 76 g t-butyl acetoacetic ester are added dropwise. The temperature is increased within 1.5 h to 150° C. and held for such time until no more distillate passes over. A vacuum is applied in order to remove he residues of -butanol and unreacted educt.

Then 42.8 g acetoacetoxyethyl methacrylate are worked in. Neutralisation is effected with 19.2 g methyldiethanolamine. With 1383 g of completely demineralised water a finely particled stable dispersion with a solids of 40 wt-% is produced. Then 41 g of a 25 wt-% solution of glutardialdehyde in water are added and stirred for 2 h at 25°–30° C.

| acid number (mg KOH/g): | 30.1 |
| pH value: | 7.5 |
| solids: (30 min. 150° C.) | 40.3 wt-% |

EXAMPLE 3

641 g of a commercially available polycaprolactone diol with the hydroxy number 112 and 48.2 g dimethylol propionic acid are dehydrated for 1 h at 110° C. in a vacuum. Cooling is effected to 60° C. and 177.6 g isophorone diisocyanate are added in such a way that a temperature of 85° C. is not exceeded. The reaction mixture is held at this temperature until such time as no more free isocyanate can be detected. The reaction mixture is heated to 100° C. and 76 g t-butyl acetoacetic ester are added dropwise. The temperature is increased within 1.5 h to 150° C. and held for such time until no more distillate passes over. A vacuum is applied in order to remove the residues of t-butanol and unreacted educt.

Neutralisation is effected with 19.2 g methyldiethanolamine. With 1383 g of completely demineralised water a finely particled stable dispersion with a solids of 40 wt-% is produced. With a view to chain extension 40 g N-(4,4'-dimethoxybutyl)methacrylamide are added and stirred for 4 h.

| acid number (mg KOH/g): | 29.4 |
| pH value: | 7.4 |
| solids: (30 min. 150° C.) | 41.2 wt-% |

EXAMPLE 4

The acetourethane is synthesised in a manner analogous to Example 2. Besides the acetoacetoxyethyl methacrylate additional monomers are used which are introduced together into the resin phase:

1. 40.0 g styrene
2. 50.0 g methyl methacrylate
3. 30.0 g butyl acrylate

Then neutralisation is effected with 19.2 g methyldiethanolamine. With 1544 g of completely demineralised water a finely particled dispersion with a solids content of 40 wt-% is produced. With a view to producing the macromer (by chain extension), 21.6 g of a 37% (wt-%) formaldehyde solution are added and stirred for 3 h at 30° C. Copolymerisation is started with 10 g of a commercially available radical initiator tert.-butylperoctoate at 80° C. After 4 h reaction time an almost monomer-free polyurethane acrylic dispersion is obtained.

| acid number (mg KOH/g): | 20.1 |
| pH value: | 7.2 |
| solids: (30 min. 150° C.) | 40.1 wt-% |

EXAMPLE 5

The polyurethane resin is worked in a manner analogous to Example 4. The comonomers styrene, methyl methacrylate and butyl acrylate are not added to the resin phase but to the aqueous dispersion, and are then subjected to copolymerisation.

| acid number (mg KOH/g): | 20.2 |
|---|---|
| pH value: | 7.2 |
| solids: | 40.0 wt-% |

EXAMPLE 6

Working proceeds in a manner analogous to Example 4. By way of comonomers, 40 g butyl acrylate and 20 g butanediol monoacrylate and 10 g hydroxyethyl methacrylate are worked into the resin together with the acetoacetoxyethyl methacrylate.

Immediately after formation of the dispersion and functionalisation, copolymerisation follows as in Example 4.

Analytical characteristic data:

| acid number (mg KOH/g): | 21.4 |
|---|---|
| pH value: | 7.4 |
| solids: | 41.7 wt-% |
| (30 min. 150° C.) | |

EXAMPLE 7

Working proceeds in a manner analogous to Example 3. A mixture consisting of 50 g butyl acrylate, 20 g butanediol diacrylate, 30 g ethyl methacrylate and 40 g styrene is worked into the aqueous dispersion. Copolymerisation is effected as in Example 4. A crosslinked PU acrylic dispersion is formed.

| acid number (mg KOH/g): | 21.2 |
|---|---|
| pH value: | 7.3 |
| solids: | 42.1 wt-% |

EXAMPLE 8

Working proceeds as in Example 1. After functionalisation with 34 g of formaldehyde solution 10 g of a commercially available radical initiator, tert.-butylperoctoate, are added to the macromonomer obtained and heating is effected to 80° C. After 4 hours' reaction time at this temperature a homopolymer is obtained in the form of a dispersion with the following characteristic data:

| acid number (mg KOH/g): | 29.5 |
|---|---|
| pH value: | 7.4 |
| solids (30 min, 150° C.): | 39.5 wt-% |

We claim:

1. Aqueous dispersion of polyurethane resins, which is obtained from
   a) one or more polyurethanes which contain at least one CH acidic group, at least one ionic group, a group that is capable of being converted into an ionic group and/or a non-ionic hydrophilic group and optionally, OH and/or NH groups, by
   b) introduction of one or more olefinic double bonds by reaction with
      $b_1$ at least one compound which can react with at least two CH-acidic groups, and simultaneously or thereafter with one or more compounds which contain a CH acidic group and an olefinic double bond with the general formula

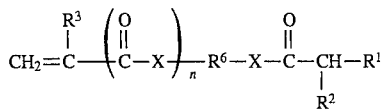

n=0 or 1,
X=O or NH, whereby the groups X may be the same or different,
$R^1$=H, $C_1$-$C_6$ alkyl, —COOR$^3$,
$R^2$=—CN, —COOR$^3$, —CONR$^3_2$,

$R^3$=H, linear or branched $C_1$-$C_8$ alkyl, whereby the residues $R^3$ may be the same or different,
$R^6$=$C_1$-$C_{12}$ alkylene, cycloalkylene, arylene or alkarylene
and/or
   $b_2$) one or more compounds which contain an olefinic double bond and also a group that is capable of reacting with CH acidic groups and that has the general formula VII

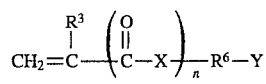

n=0 or 1
Y=NCO, CHO, CH(OR)$_2$
$R^6$, X, $R^3$=as defined under $b^1$),
R=alkyl with $C_1$ to $C_6$,
and/or
   $b_3$) one or more compounds which contain an olefinic double bond and also a group that is capable of reacting with OH or NH groups and that has the general formula VIII

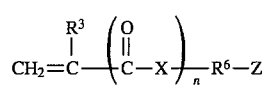

with n, $R^3$, X, $R^6$=as defined under $b_1$) and Z=isocyanane or epoxide group,
and/or
   $b_4$) formaldehyde,
in aqueous or non-aqueous phase whereupon a reaction product of a) and b) which is not yet present in aqueous phase is converted into the aqueous phase and in the aqueous phase is radically polymerized, optionally together with one or more radically polymerisable unsaturated monomers, optionally in the presence of customary additives.

2. Process for the production of the aqueous dispersions of polyurethanes according to claim 1, characterised by reaction in aqueous or non-aqueous phase of
   a) one or more polyurethane resins which contain at least one CH acidic group, at least one ionic group, a group that is capable of being converted into an ionic group and/or a non-ionic hydrophilic group and also, optionally, OH and/or NH groups, so as to be capable of introducing one or more olefinic double bonds with
      $b_1$) one or more compounds which contain a CH acidic group and an olefinic double bond, as defined in claim 1, and/or b₂) one or more compounds which contain an olefinic double bond and also a group that is capable of reacting with CH acidic groups, as defined in claim 1, and/or b₃) one or more compounds which contain an olefinic double bond and also a group that is capable of reacting with OH or NH groups, as defined in claim 1, and/or b₄) formaldehyde, whereupon a reaction product of a) and b) which is not yet present in aqueous phase is converted into the aqueous phase and in the aqueous phase is radically polymerised, optionally together with one or more radically polymerisable unsaturated monomers, optionally in the presence of customary additives.

3. Dispersion according to claim 1, wherein when the polyurethanes a) are reacted with the component b₁), b₂), and/or b₃) the polyurethanes a) are chain extended before or during the introduction of olefinic double bonds with c) at least one compound which can react with at least two CH acidic groups.

4. Dispersion according to claim 1, wherein the polyurethanes of component a) are obtained by reaction of A) one or more polyurethane resins containing hydroxyl groups, whereby said polyurethanes may contain urea groupings, with at least one ionic group, a group that is capable of ion formation and/or a hydrophilic group per molecule and an OH number of 10 to 150, in non-aqueous medium, with B) one or more compounds which exhibit at least one functional group suitable for reaction with at least a portion of the OH groups of the polyurethane resins A and in addition contain at least one CH acidic group.

5. Dispersion according to claim 1, characterized in that the polyurethane resins are anionically stabilized.

6. Dispersion according to claim 1, characterized in that the polyurethane resins are not crosslinked.

7. Dispersion according to one claims 1, characterized in that the polyurethane resins are wholly or partially present in the form of crosslinked microgels.

8. Dispersion according to claim 3, characterized in that the polyurethane resins are obtained from 15 to 50 wt-% of the unsaturated polymerisable monomers and 85 to 50 wt-% of the reaction product formed from a), b) and, optionally, c).

9. Dispersion according to claim 1, charaterized in that the polyurethane resins exhibit an acid number of 5 to 90, an OH number of 5 to 100 and a number average molecular weight (Mn) above 50,000.

10. Dispersion according to claim 1, characterized in that the reaction with the components b₂) or b₃) is effected in the organic phase.

11. Dispersion according to one claim 1, characterized in that the reaction with the components b₁), b₂) or b₄) is effected in the aqueous phase.

12. Dispersion according to claim 3, characterized in that the chain extension with c) is effected simultaneously with the reaction with b).

13. Dispersion according to claim 12, characterized in that the chain extension with c) is effected in the aqueous phase.

14. Dispersion according to claims 1, characterized by the addition of polymerizable unsaturated monomers in the aqueous phase.

15. Polyurethane macromonomer, obtained by reaction in aqueous or non-aqueous phase of a) one or more polyurethanes which contain at least one CH acidic group, at least one ionic group, a group that is capable for being convened into an ionic group and/or a non-ionic hydrophilic group and optionally, OH and/or NH groups, by b) introduction of one or more olefinic double bonds by reaction with b₁) at least one compound which can react with at least two CH-acidic groups and simultaneously or thereafter with one or more compounds which contain a CH acidic group and an olefinic double bond, having the formula VI

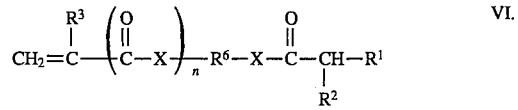

n=0 or 1,

X=O or NH, whereby the groups X may be the same or different,

R¹=H, C₁–C₆ alkyl, —COOR³,

R²=—CN, —COOR³, —CONR³₂,

R³=H, linear or branched C₁–C₈ alkyl, whereby the residues R³ may be the same or different, R⁶=alkylene, cycloalkylene, arylene or alkylarylene, in particular with C₁ to C₁₂, and/or b₂ one or more compounds which contain an olefinic double bond and also a group that is capable of reacting with CH acidic groups, having the formula VII

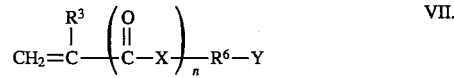

n=0 or 1

Y=NCO, CHO, CH(OR)₂,

R⁶, X, R³=as defined under b₁),

R=alkyl with C₁ to C₆, and/or b₃ one or more compounds which contain an olefinic double bond and also a group that is capable of reacting with OH or NH groups having the formula VIII

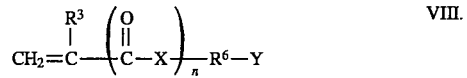

with n, R³, X, R⁶=as defined under b₁) and

Y=isocyanate or epoxide group, and/or b₄ formaldehyde.

16. Polyurethane macromonomer according to claim 15, wherein when the polyurethanes are reacted with the component b₁), b₂), b₃), and/or b₄) the polyurethanes a) are chain extended before or during the introduction of olefinic double bonds with c) at least one compound which can react with at least two CH acidic groups, whereupon a reaction product of a), b) and c) which is not yet contained in aqueous phase can be converted into the aqueous phase.

17. Polyurethane macromonomer according to claim 16, characterized in that the component c) and the component b₄) are the same.

18. Aqueous coating agent containing an aqueous dispersion of polyurethane resins according to claim 1, with one or more customary crosslinking agents and optionally one or more solvents and/or additives that are customary in lacquering.

19. Aqueous coating agent according to claim 18, characterised in that the aqueous dispersion of polyurethane resins are present in the form of non-crosslinked particles or contain such particles.

20. Aqueous coating agent according to claim 18, characterized in that the aqueous dispersion of polyurethane resins are present in the form of crosslinked microparticles or contain such microparticles.

21. Coating agent according to claim 18 containing in addition one or more other binding agents in an amount up to 90 wt-%, relative to the sum of the weights of the solids of all binding agents (polyurethane resins+additional binding agents).

* * * * *